United States Patent
Saito (10) Patent No.: US 8,862,990 B2
(45) Date of Patent: Oct. 14, 2014

(54) INFORMATION PROCESSING APPARATUS AND DATA PROCESSING METHOD FOR GENERATING PRINT INFORMATION BASED ON A PRINT INSTRUCTION FROM A BROWSER

(75) Inventor: Megumi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 12/846,657

(22) Filed: Jul. 29, 2010

(65) Prior Publication Data

US 2011/0029863 A1  Feb. 3, 2011

(30) Foreign Application Priority Data

Aug. 3, 2009  (JP) ................. 2009-180801

(51) Int. Cl.
*G06F 17/00* (2006.01)
*G06F 17/30* (2006.01)

(52) U.S. Cl.
CPC ............................. *G06F 17/30899* (2013.01)
USPC ........................... 715/274; 715/276; 715/249

(58) Field of Classification Search
CPC ............................. G06F 17/212; G06F 17/211
USPC .......................................... 715/274, 249, 276
See application file for complete search history.

(56) References Cited

U.S. PATENT DOCUMENTS

| | | | |
|---|---|---|---|
| 6,856,415 B1 * | 2/2005 | Simchik et al. | 358/1.15 |
| 7,849,201 B1 * | 12/2010 | Subbarao et al. | 709/228 |
| 2003/0033400 A1 * | 2/2003 | Pawar et al. | 709/223 |
| 2003/0086098 A1 * | 5/2003 | Sesek et al. | 358/1.1 |
| 2004/0133612 A1 * | 7/2004 | Satomi | 707/205 |
| 2005/0028090 A1 * | 2/2005 | Sweet et al. | 715/513 |
| 2005/0262438 A1 * | 11/2005 | Armstrong et al. | 715/523 |
| 2006/0190521 A1 * | 8/2006 | Kojima | 709/200 |
| 2007/0288589 A1 * | 12/2007 | Chen et al. | 709/217 |
| 2008/0256140 A1 * | 10/2008 | Lazzaro et al. | 707/203 |
| 2009/0287659 A1 * | 11/2009 | Bennett | 707/3 |

FOREIGN PATENT DOCUMENTS

| | | | |
|---|---|---|---|
| JP | 2001-142657 A | 5/2001 | |
| JP | 2002-132624 A | 5/2002 | |
| JP | 2004-110116 A | 4/2004 | |
| JP | 2006-146458 A | 6/2006 | |
| JP | 2006-178531 A | 7/2006 | |
| JP | 2009-081884 A | 4/2009 | |

OTHER PUBLICATIONS

Peter Weverka, PowerPoint 2007 All-in-One Desk Reference for Dummies, 2007, Wiley Publishing, pp. 22, 25.*
Yoshinobu Fukano, Kyo Akagi, Toshifumi Arai; "Event Recording Browsing System Personal Database System with a Simplified Interface to Manage Various Types of Data;" May 21, 2004; vol. 2004, No. 51, p. 17-24.

* cited by examiner

*Primary Examiner* — Cesar Paula
*Assistant Examiner* — Howard Cortes
(74) *Attorney, Agent, or Firm* — Canon U.S.A., Inc. IP Division

(57) ABSTRACT

According to the present invention, even if information on a page displayed on a browser browsed by a user shifts to another page, the user can select and store a necessary page. An information processing apparatus according to the present invention generates, when displaying information obtained via a network on a display unit, print information of the information displayed on the display unit based on a print instruction from the browser, and further stores the generated print information in a storage unit. When a destination from which the information is obtained is different from a just primarily preceding destination, the display unit displays a list of the information stored in the storage unit.

9 Claims, 9 Drawing Sheets

INFORMATION PROCESSING APPARATUS AND DATA PROCESSING METHOD FOR GENERATING PRINT INFORMATION BASED ON A PRINT INSTRUCTION FROM A BROWSER

BACKGROUND OF THE INVENTION

1. Field of the Invention

The present invention relates to an information processing apparatus that can display data obtained on a network.

2. Description of the Related Art

Along with the widespread use of the Internet, various sites are opened and a user can acquire favorite information at convenient time with a browser installed in a computer. Further, a large number of sites are opened which provide convenient services to many users, who input and transmit data on a shopping site or a registration screen of an event. The user can also pre-arrange hotel accommodation. However, a user may sometimes "forget URL" or "cannot access information under an environment providing no network" when the user wishes to obtain specific information. Various technologies are proposed and developed to address the problems.

Japanese Patent Application Laid-Open No. 2006-178531 discusses a technology for automatically recording the situation of web browsing to make use of it. Moreover, Japanese Patent Application Laid-Open No. 2002-132624 discusses a technology for collecting and printing web pages according to data that is automatically determined if the web to be browsed and the date for web browsing are designated in advance. In addition, software is developed to store a web page which is browsed (e.g., refer to "http://www.kamilabo.jp/copi/index.html").

Conventionally, since a server manages a session in many web sites to provide services based on information input by a user, the information needs to be simultaneously stored when it is displayed. Once the web site moves to another page, the similar information is not displayed.

Therefore, when displaying information, the information needs to be surely stored. Totally similar information is not displayed again according to the conventional art. While necessary information can be stored according to the conventional art, the user needs to perform storage operation and therefore cannot store the information when the user moves to another page and forgets the storage through carelessness.

This situation occurs due to the structure of many web sites that perform the session management. Upon receiving data from the user, many web sites that perform the session management displays a request check screen on the browser of the user.

If the information does not include any problems, the user transmits information indicating the fact that there are no problems, to the server. Therefore, the server performs determination processing for providing services based on information about user's intention.

When the services are provided, a processing end screen is transmitted, including a processing ID (generally displayed as a reception ID or purchase No.), and displayed in the browser viewed by the user. Information displayed in the browser viewed by the user is created by combining information for each user (e.g., date and time or processing ID) with a format available to any users. Therefore, the user cannot obtain and view later the information that was displayed once.

Since the user is concentrating on completing the procedure for receiving the services, the user is not conscious of storage of the information in many cases until the processing ID is displayed. In addition, since the processing ID and a user input check screen are separately displayed in many cases, the user may fail to store the user input check screen.

SUMMARY OF THE INVENTION

The present invention is directed to select and store a page required by a user even when information on one page displayed on a browser which the user views, shifts to another page.

According to an aspect of the present invention, an information processing apparatus that can obtain information via a network includes a display control unit that displays the information obtained via the network on a display unit, and a generation unit that generates print information of the information displayed on the display unit based on a print instruction from the display control unit. The generation unit stores the generated print information in a storage unit.

Further features and aspects of the present invention will become apparent from the following detailed description of exemplary embodiments with reference to the attached drawings. Like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
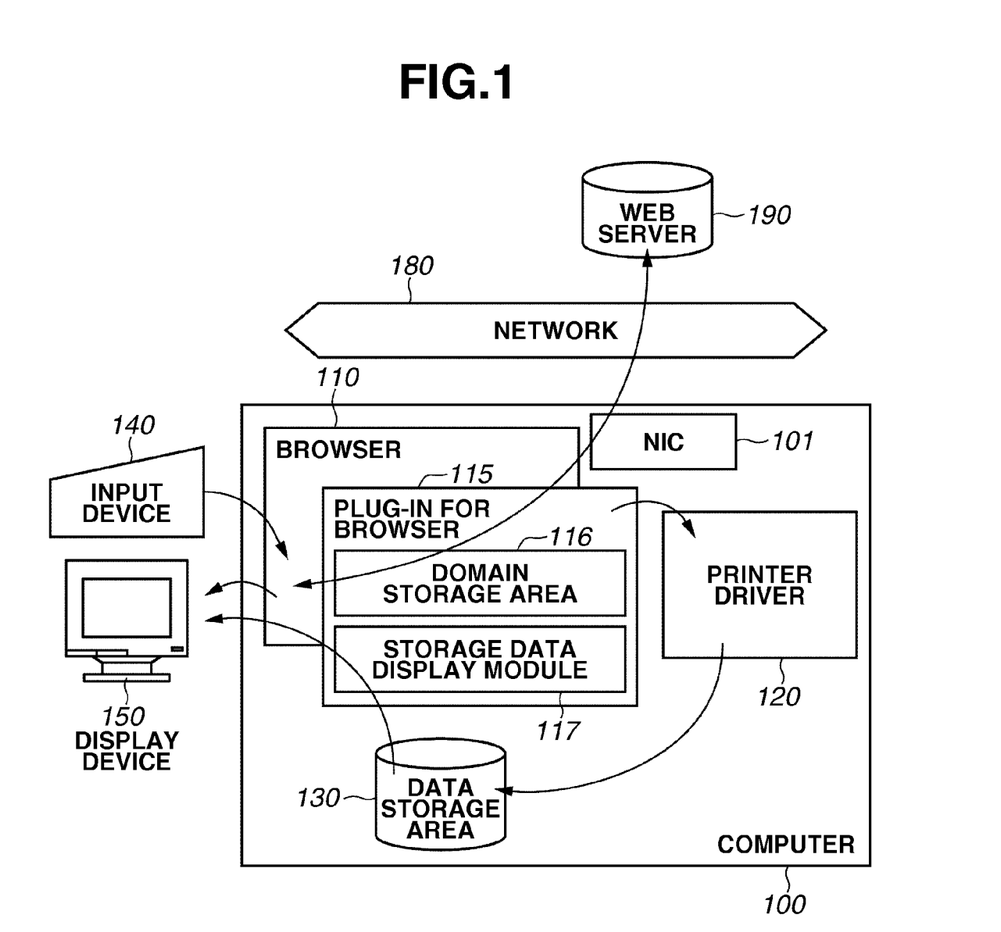
FIG. 1 is a block diagram illustrating an example of an information processing system.

FIG. 1 is a block diagram illustrating an example of an information processing system to which an information processing apparatus according to the first exemplary embodiment of the present invention is applied.

The first exemplary embodiment shows an example system for processing in which a homepage provided by a web server is obtained using web browser software (hereinafter, referred to as a browser) installed in the information processing apparatus (computer) and the user inputs information. A hardware resource of a computer 100 includes a controller unit having a central processing unit (CPU), a read-only memory (ROM), and a random access memory (RAM) and input/output interfaces. The CPU loads, to the RAM, an OS, a driver, and application that are installed in a hard disk drive (HDD), and executes various programs. Herein, the CPU executes a browser, which will be described later, a plug-in for browser, and a printer driver. More specifically, the CPU systematically controls units and processing, including the implementation of the selected application, with the hardware resources connected to an internal device.

In the example system, communication (session) is performed between the computer 100 and a web server 190 with a hypertext transfer protocol (HTTP). The browser functioning as browsing software is installed in advance in the computer 100, corresponding to the OS. Further, the user can obtain a browser from a server (not illustrated) by the computer 100, or can install a browser provided via a medium such as a compact disk read-only memory (CD-ROM). Therefore, the present invention is not limited to a specific browser. According to the first exemplary embodiment, a plug-in 115 for browser functions as software for providing a display control function.

Referring to FIG. 1, an input device 140 and a display device 150 are connected to the computer 100. The computer 100 can obtain information (web page) via a network 180 using a browser 110. The input device 140 is used to input a uniform resource locator (URL) for indicating a page to be displayed by the browser 110 and to change the setting.

The display device 150 displays various user interfaces (UIs). The computer 100 includes a network interface (hereinafter, referred to as an NIC) 101, and is connected to the network 180 via the NIC 101.

The network 180 is connected to the computer 100 via the NIC 101, and is also connected to a server, e.g., the web server 190, which provides variety of services, thereby distributing various data.

The computer 100 stores the browser 110, the plug-in 115 for browser, and a dedicated printer driver (hereinafter, referred to as a printer driver) 120 used by the plug-in 115 for browser.

The plug-in 115 for browser is a module for adding a function to the browser 110 but may also be included in one of functions of the browser 110. According to the present invention, the plug-in 115 for browser realizes a function for automatically storing information displayed by the user using the browser 110 under a set condition, according to a user's operation, which will be described later.

The plug-in 115 for browser secures a domain storage area 116. The domain storage area 116 is secured in a storage device such as a memory or HDD, provided for the computer 100, and is used when the plug-in 115 for browser stores the current domain.

The printer driver 120 is used when the plug-in 115 for browser stores information. When the information displayed on the display device 150 satisfies a condition for storing the information, the plug-in 115 for browser issues an instruction for printing data to the printer driver 120.

The printer driver 120 generates print information in a file format, e.g., XML paper specification (XPS) or portable document format (PDF) as an intermediate file format, at a determined storage position provided in the computer 100, and outputs the generated print information to a data storage area 130. Although the data output destination of the printer driver 120 may be a specific storage position, a path to the output destination may be received from the plug-in 115 for browser and the printer driver 120 may be stored there.

The computer 100 includes the data storage area 130 that stores the data generated by the dedicated printer driver 120. The data storage area 130 can be accessed by both the printer driver 120 and the storage data display modules 117 provided in the plug-in 115 for browser. Further, the position of the data storage area 130 is grasped by the printer driver 120 and the storage data display module 117. The printer driver 120 generates the XPS file and stores the generated file in the data storage area 130. The generated file is not limited to the XPS format, and may be an open file format, e.g., PDF, as the intermediate file format. Further, information required for the plug-in 115 for browser may be added to drawing information for graphics device interface (GDI) and stored, which is sent to the printer driver 120 via the OS function. Thus, the deterioration of the information can be prevented. Herein, the GDI is one of three main components (subsystems) of Windows (registered trademark), which cooperates with kernel and the user (window manager).

The plug-in 115 for browser includes the storage data display module 117. When a condition for displaying the stored data is satisfied, the storage data display module 117 displays the user interface (UI) illustrated in FIG. 2. Further, the storage data display module 117 obtains and analyzes the data stored in the data storage area 130, displays the UI in FIG. 2 based on the analysis result, and controls the UI in FIG. 2. The user can set in advance a display condition on a setting screen illustrated in FIG. 3B.

Figure 2:
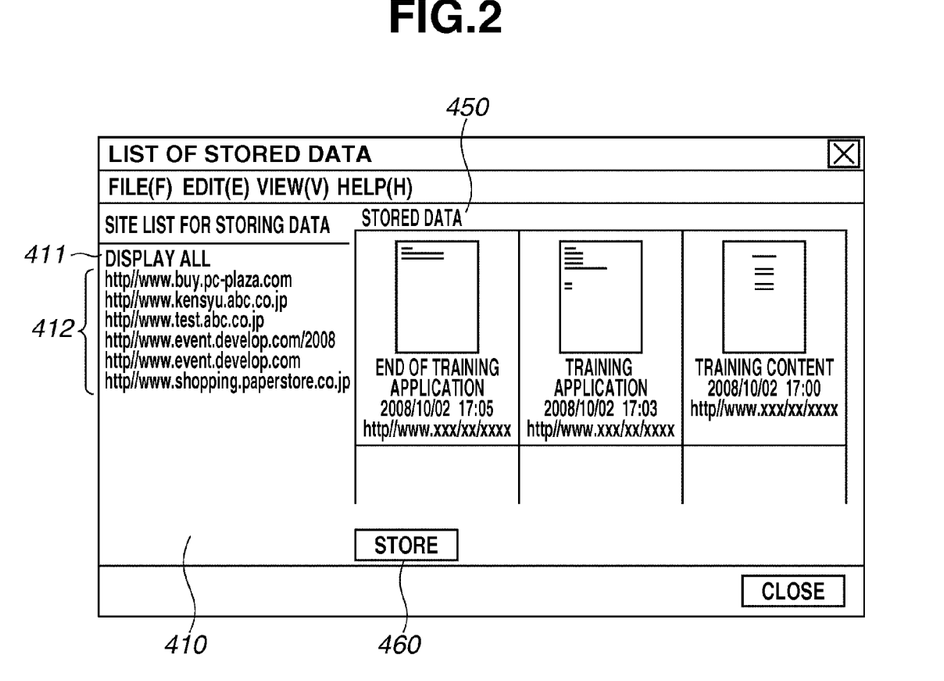
FIG. 2 is a diagram illustrating an example of a user interface (UI) displayed on a display apparatus.

FIG. 2 is a diagram illustrating an example of the UI displayed on the display device 150 in FIG. 1. This is a UI example for displaying a list of data stored in a storage device such as a hard disk (HD). The user selects a page displayed in a thumbnail format on the list screen, and determines the page to be finally stored. More specifically, the user deletes an unnecessary web page from information (web pages) automatically stored as print information using the plug-in 115 for browser and the printer driver 120 under the set storage condition, and stores a necessary web page. The web pages on the list may be displayed in order based on the elapse time and alternatively may be displayed from the latest stored web page. Alternatively, the selected web page may be displayed on the display device 150, and may be then stored in the data storage area as information edited based on information input from the input device 140. Alternatively, the web page registered in the data storage area 130 may be searched by using the information input in the edition as a search condition, and may be then displayed on the display device 150. When the web page is displayed in the data storage area 130, a password enabling only a specific user to browse, can be set and registered, so that control is performed which prevents an unspecified user from browsing a secret web page.

The UI in FIG. 2 includes a storage data display area 450 that displays the stored data, a list box 410 for domain selection which can determine filtering of display data, and a storage button 460 for storing the selected data.

The list box 410 for domain selection displays an item 411 for displaying all data, and a domain list 412 having a list of data domains stored in the data storage area 130. When the user selects the item 411 that displays all data in the list box 410 for domain selection, the storage data display area 450 displays all data stored in the data storage area 130. Further, when the user selects one of the domains displayed in the domain list 412 of the list box 410 for domain selection, the storage data display area 450 displays only data at the domain selected from the data stored in the data storage area 130.

Furthermore, when the user selects the data displayed in the storage data display area 450 and depresses a storage button 460, the selected data is stored in an arbitrary position. If a plurality of data is selected at this time and the storage button 460 is depressed, the selected data is stored in a lump.

Figure 3A:
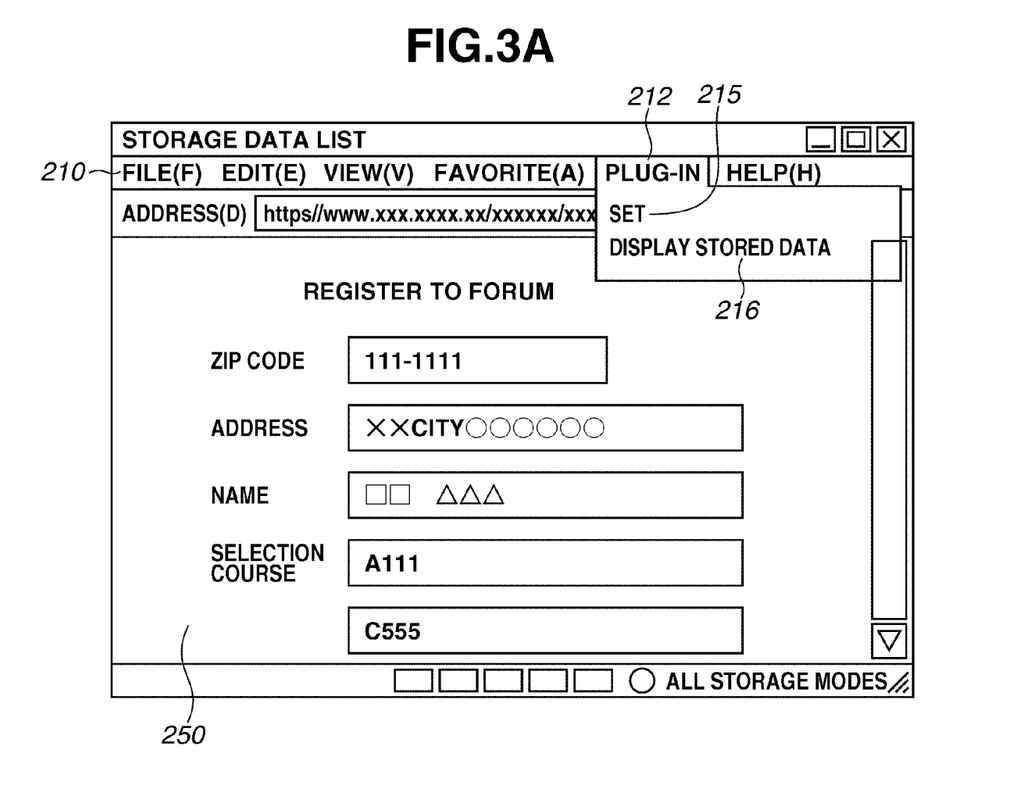
FIGS. 3A and 3B are diagrams illustrating examples of the UI displayed on the display apparatus.
Figure 3B:
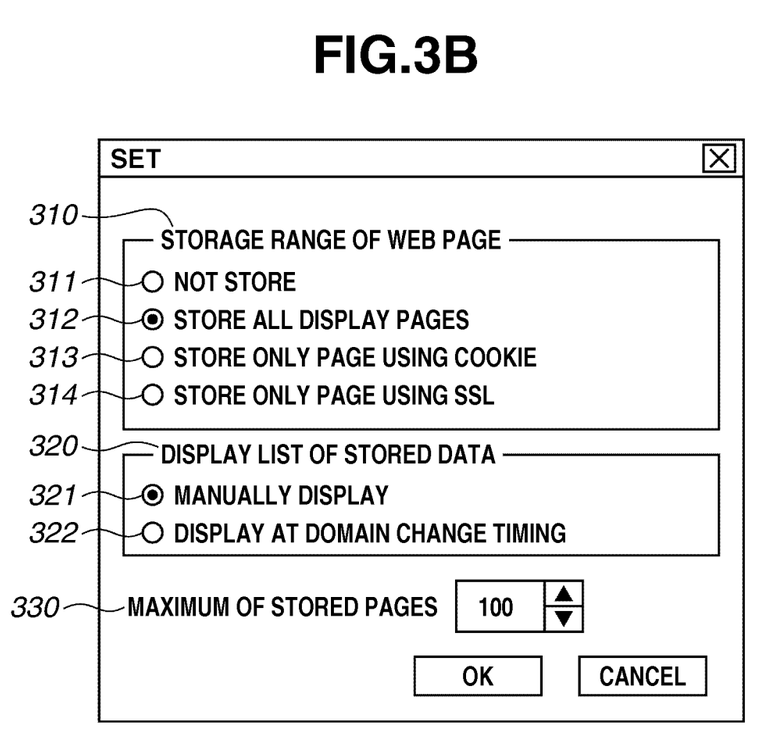

FIGS. 3A and 3B are diagrams illustrating examples of the UI displayed on the display device 150 in FIG. 1. FIG. 3A illustrates a screen for instructing an input on a screen displayed by the browser 150, and FIG. 3B illustrates a screen for setting the operation of the plug-in 115 for browser when a plug-in menu is selected in FIG. 3A. Hereinbelow, processing for automatically storing the web page by the plug-in 115 for browser is described when information is input which is required for the web page obtained by the user with the UI in FIG. 3A.

FIG. 3A illustrates an example of the browser UI when there is the plug-in 115 for browser. The browser UI includes a menu 210 for using the functions of the browser 110 and the plug-in 115 for browser and an information display area 250 indicating the current operation mode. When a plug-in 212 is selected as an option for using the function of the plug-in 115 for browser in the menu 210, the display device 150 selectably displays one of setting 215 and storage data display 216.

When the user selects the setting 215 using the input device 140, the display device 150 displays a UI for setting illustrated in FIG. 3B as an example to set the details of the operation of the plug-in 115 for browser. The user may use a pointing device as the input device 140.

Referring to FIG. 3A, the user selects the storage data display 216 using the input device 140, the storage data display module 117 in FIG. 1 is then called, and the display device 150 displays the UI for displaying the stored data in FIG. 2.

The setting screen in FIG. 3B includes storage range setting 310 for setting the storage range of the web page, setting 320 of the list of stored data that sets the display timing of the list of stored data, and maximum-number setting 330 that sets the maximum number of stored pages. The setting screen in FIG. 3B functions as a screen for setting the storage condition to store the web page displayed by the browser 150. According to the first exemplary embodiment, the buttons can select one of all the web pages (button 312), the web page of a specific session mode (SSL), and the web page of a specific-information write mode (cookie).

The user selects the button, thereby setting in advance a storage range for storing the web page displayed by the browser 110 and the timing for displaying the list of stored web pages. The user can change the storage range of the web page that is once set and the timing for displaying the stored web page.

The option of the storage range setting 310 for the web page includes a non-storing button 311, the button 312 for storing all the display pages, a button 313 for storing only the web page using the cookie, and a button 314 for storing only the page using the SSL.

When the user selects the non-storing button 311, the displayed web page is not stored, and the setting 320 of the list of stored data for displaying the data and the maximum-number setting 330 of the stored pages are invalidated. The maximum-number setting 330 may be controlled to automatically set the number of pages smaller than the number of pages set by the user according to a free storage space of the storage device.

When the user selects the button 312 for storing all the display pages as a first storage condition for the web pages displayed by the browser 110, all the displayed web page is stored in the data storage area 130. Further, when the user selects the button 313 for storing the web page using the cookie as a second storage condition for the web page displayed by the browser 110, only the web page using the cookie is stored in the data storage area 130. Furthermore, when the user selects the button 314 for storing only the web page using the SSL as a third storage condition for the web page displayed by the browser 110, only the web page using the SSL is stored in the data storage area 130.

The SSL is a secure sockets layer protocol developed by Netscape Communications, and encrypts information on the Internet and provides secure communication. The cookie is a system for temporarily writing data in a computer of a visitor via the web browser by a provider of the web site and storing the data. When the SSL is valid, the display of the connecting URL is changed from http to https.

An option of the setting 320 of the stored data list for displaying the data includes a button 321 that is manually displayed and a button 322 that is displayed at the timing of domain change. When the user selects the button 321 that is manually displayed, the storage data display module 117 is called only when the storage data display 216 is selected from the menu 210, and the display device 150 displays the UI for displaying the list of stored data illustrated in FIG. 2. When the user selects the button 322 that is displayed at the timing of domain change, the plug-in 115 for browser determines the timing of domain change. Then, the storage data display module 117 is called, and the display device 150 displays the UI that displays the stored data in FIG. 2. In the maximum-number setting 330 of stored pages, a value input here is the maximum number of stored pages (100 is currently set to the maximum number of stored pages).

Referring to FIG. 3B, when the web page displayed by the browser 110 is automatically stored, control may be performed to display the web page stored suitably in a environment desired by the user by providing buttons for selecting the XPS and PDF as a print file format. The printer driver 120 generates the print information in the print file format from the web page in response to the print instruction from the plug-in 115 for browser, and stores the generated information in the data storage area 130.

Figure 4:
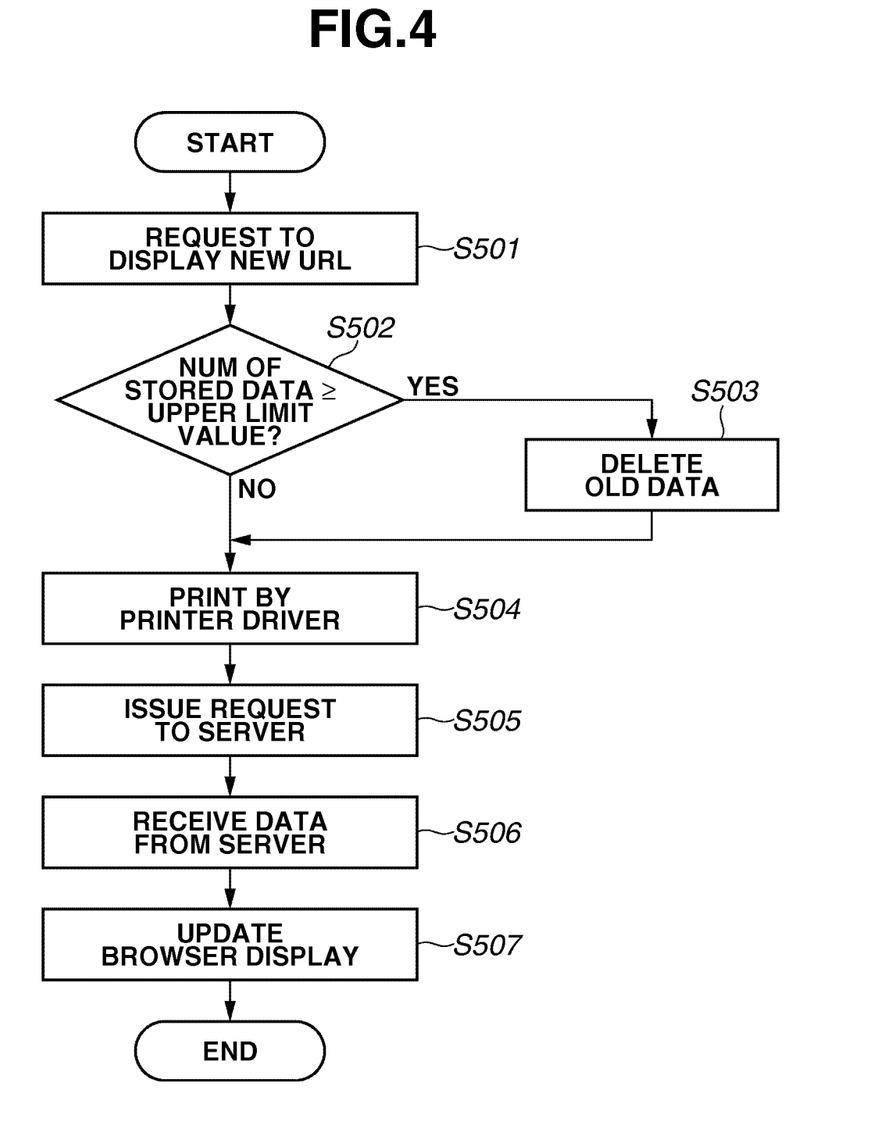
FIG. 4 is a flowchart illustrating one data processing procedure of the information processing apparatus.

According to the first exemplary embodiment, the user can select one of the buttons 312 to 314 as the storage condition for automatically storing the web page displayed by the browser 110. FIG. 4 is a flowchart illustrating an example of a data processing procedure in the information processing apparatus according to the first exemplary embodiment. The example illustrates web browsing processing using the browser 110 and the plug-in 115 for browser illustrated in FIG. 1. Steps S501 to S507 are realized by loading a program including the browser 110 and the plug-in 115 for browser to the RAM from the hard disk (HD) by the CPU of the computer 100 to execute the program. The processing is executed using the browser 110 and the plug-in 115 for browser integrally. Further, the processing will be described with the browser 110 and the plug-in 115 for browser functioning as main control units. Hereinafter, processing will be described which automatically stores data on the web page displayed on the display device 150 using the browser 110, the plug-in 115 for browser, and the printer driver 120.

In step S501, the browser 110 receives a request for displaying a new URL based on an operation from the user. Then, the processing proceeds to step S502. In step S502, the plug-in 115 for browser checks the number of data stored in the data storage area 130. Specifically, the plug-in 115 for browser determines whether or not the number of data stored in the data storage area 130 is an upper limit value or more, which is set by the maximum-number setting 330 of the stored page. When the plug-in 115 for browser determines that the number of data stored in the data storage area 130 is less than the upper limit value (NO in step S501), the processing proceeds to step S504. When the plug-in 115 for browser determines that the number of data stored in the data storage area 130 is the upper limit value or more (YES in step S501), the processing proceeds to step S503. In step S503, the plug-in 115 for the browser sequentially deletes the data stored in the data storage area 130 in order of the oldest data, up to the number of data smaller than the upper limit by value one, and the processing proceeds to step S504. In step S504, the plug-in 115 for browser issues an instruction for printing the web page displayed by the browser 110 to the printer driver 120. In response to the print instruction in step S504, the printer driver 120 generates the print information (intermediate file) for data storage. Although as examples, the PDF and XPS file are illustrated as the intermediate files according to the first exemplary embodiment, different intermediate file format may also be used.

According to the first exemplary embodiment, the storage device can store the final state of the displayed web page by issuing the print instruction at this timing. Further, the printer driver 120 stores the print information generated from the information from the web page in response to the print instruction from the plug-in 115 for browser, so that all the web pages are stored in the data storage area 130 in a lump. Therefore, the printer driver 120 can store the data input by the user with the input device 140 in an input form in the web page. Thus, it is possible to check the data directly-input by the user to the obtained web page later at the list display time of stored data. In step S505, an HTTP request is transmitted to the web server 190 suitable to the URL received by the browser 110 in step S501 via the network 180. Then, the processing proceeds to step S506. In step S506, the browser 110 receives an HTTP response from the web server 190 via the network 180. Then, the processing proceeds to step S507.

In step S507, the browser 110 displays the web page in FIG. 3A generated based on the received data on the display device 150, and updates the display of the browser 110. Then, the processing ends.

According to the first exemplary embodiment, since the list of stored data is set to be manually displayed as illustrated in FIG. 3B, the plug-in 115 for browser controls the display operation when the storage data display 216 is selected from the menu 210.

Figure 5:
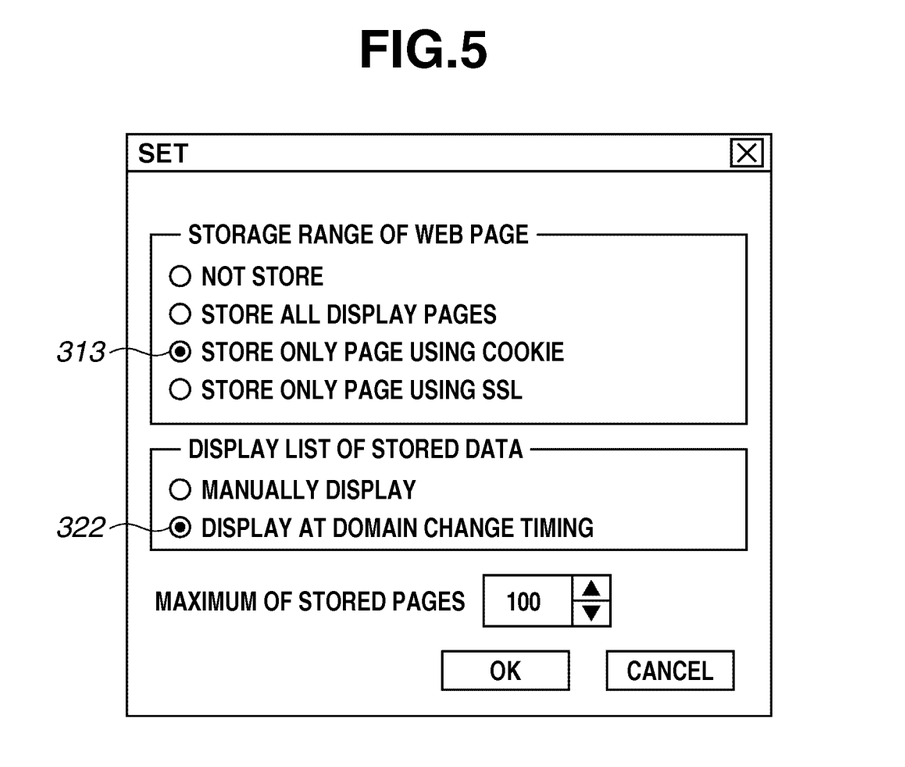
FIG. 5 is a diagram illustrating another example of the UI displayed on the display apparatus.

Next, the second exemplary embodiment of the present invention is described. FIG. 5 is a diagram illustrating an example of the UI displayed on the display device 150 in FIG. 1. The example illustrates a screen for setting the operation of the plug-in 115 for browser, which corresponds to a state in which the user selects the button 313 and the button 322 in the plug-in menu in FIG. 3A. Hereinbelow, the storage and list display of the web pages are described as an example, in which the user sets in advance such that the web page obtained from the web server 190 uses the cookie and the web page stored at the changing timing of the domain is displayed.

[Data Storage/List Display]

Figure 6:
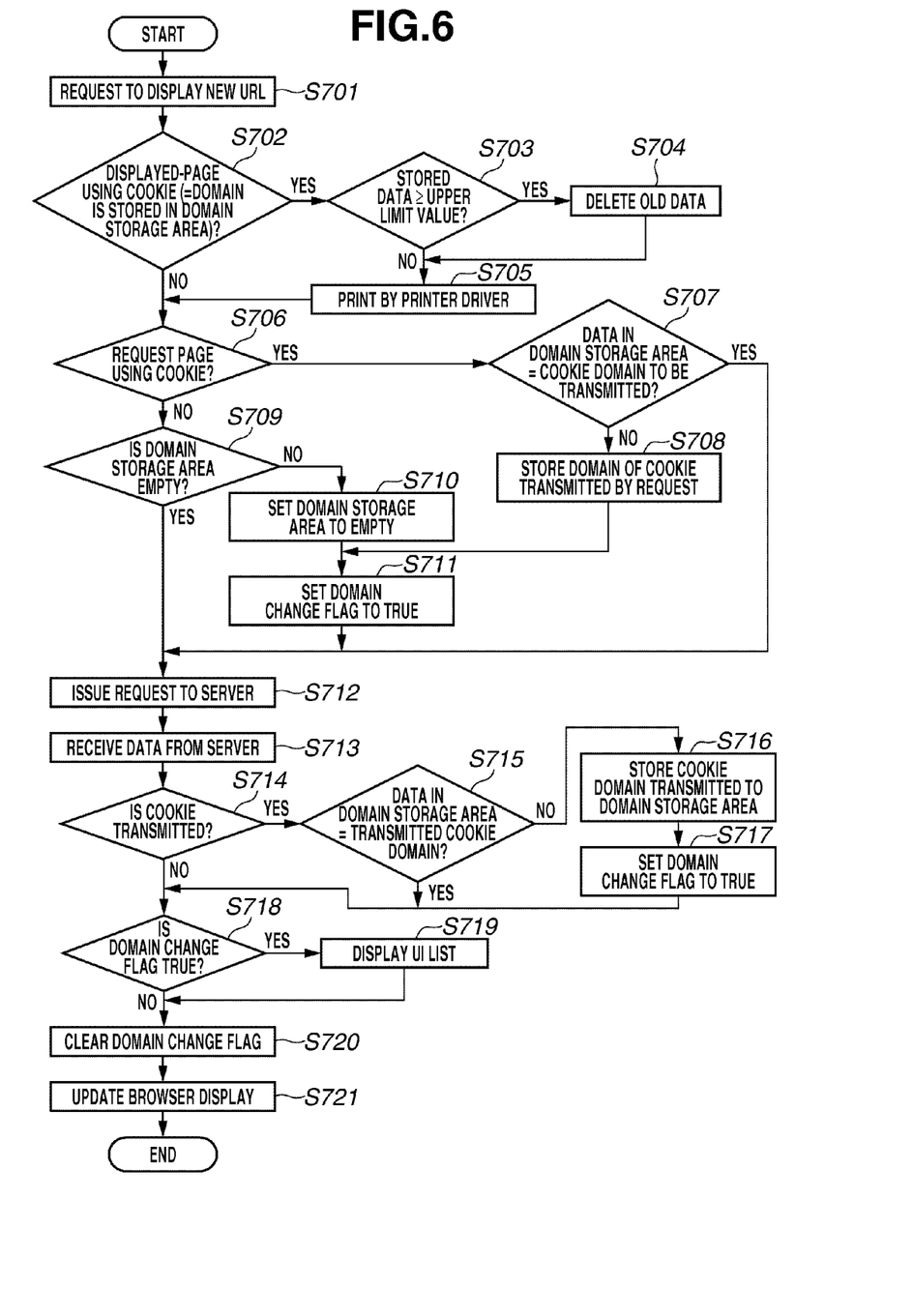
FIG. 6 is a flowchart illustrating another data processing procedure of the information processing apparatus.

FIG. 6 is a flowchart illustrating an example of a data processing procedure in the information processing apparatus according to the second exemplary embodiment. The example shows that the plug-in 115 for browser analyzes the response received from the web server 190 by the browser 110, and it is determined whether or not the web page uses the cookie for data storage processing/list display processing.

Steps S701 to S721 are realized by loading and executing a program including the browser 110 and the plug-in 115 for browser from the hard disk (HD) to the RAM by the CPU of the computer 100. The processing is executed with the browser 110 and the plug-in 115 for browser integrated. Further, for the sake of description, the processing is described taking the browser 110 and the plug-in 115 for browser as main control units.

In step S701, the browser 110 receives a request for displaying a new URL, based on an operation instruction of the user. In step S702, the plug-in 115 for browser determines whether or not the web page currently-displayed on the display device 150 uses the cookie. The determination is made by analyzing the obtained web page and determining whether or not the domain data is stored in the domain storage area 116.

When the plug-in 115 for browser determines that the web page currently-displayed on the display device 150 uses the cookie (YES in step S702), the processing proceeds to step S703. When the plug-in 115 for browser determines that the web page currently-displayed on the display device 150 does not use the cookie (NO in step S702), the processing proceeds to step S706. The determination processing in step S702 of the plug-in 115 for browser corresponds to determination as to whether or not the web page is stored.

In step S703, the plug-in 115 for browser determines whether or not the number of data stored in the data storage area 130 is the upper limit value or more, which is set by the maximum-number setting 330 of the stored page. When the plug-in 115 for browser determines that the number of data stored in the data storage area 130 is less than the upper limit value (NO in step S703), the processing proceeds to step S705. When the plug-in 115 for browser determines that the number of data stored in the data storage area 130 is the upper limit value or more (YES in step S703), the processing proceeds to step S704.

In step S704, the plug-in 115 for browser sequentially deletes the data stored in the data storage area 130 up to the number of the data less than the upper limit by one value, in order of the oldest data. The processing then proceeds to step S705.

In step S705, the plug-in 115 for browser issues a print instruction of the web page currently-displayed by the browser 110, to the printer driver 120. The processing then proceeds to step S706. In response to the print instruction in step S705, the printer driver 120 generates a file for data storage.

According to the second exemplary embodiment, the print instruction is issued at this timing, thereby automatically storing the final state of the displayed web page in the storage device. Further, the information on the web page is stored in response to the print instruction, so that all the web pages are stored in a lump. The data input in the input form can also be stored.

In step S706, the plug-in 115 for browser determines whether or not the browser 110 uses the cookie when the browser 110 transmits a request of the web page to the web server 190. This determination is made by determining whether or not an HTTP header of the transmitted request includes a cookie header. According to the second exemplary embodiment, control is performed to determine, based on the determination result, whether or not the displayed web page is stored.

When the plug-in 115 for browser determines that the cookie is used when the request of the web page (YES in step S706) is transmitted, the processing proceeds to step S707. When the plug-in 115 for browser determines that cookie is not used (NO in step S706), the processing proceeds to step S709.

In step S709, the plug-in 115 for browser determines whether or not the domain storage area 116 is empty. When the plug-in 115 for browser determines that the domain storage area 116 is not empty but includes the domain data (NO in step S709), the processing proceeds to step S710. In step S710, the plug-in 115 for browser sets the domain storage area 116 to be empty. Then, the processing proceeds to step S711.

In step S707, the plug-in 115 for browser determines whether or not the domain data stored in the domain storage area 116 is similar to the domain of the cookie included in the transmitted request.

When the plug-in 115 for browser determines that the two domains are different from each other (NO in step S707), the processing proceeds to step S708. When the plug-in 115 for browser determines that the two domains are similar to each other (YES in step S708), the processing proceeds to step S712.

In step S708, the plug-in 115 for browser obtains the domain of the transmitted cookie when the browser 110 transmits the HTTP request to the web server 190 in the domain storage area 116, and stores the obtained domain in the domain storage area 116. Then, the processing proceeds to step S711.

In step S711, the plug-in 115 for browser sets a domain change flag managed by the domain storage area 116 to TRUE. Then, the processing proceeds to step S712. The domain data of the domain storage area 116 is rewritten. More specifically, this means that the domain of newly-displayed web page is different from the domain of the web page ever-displayed. Therefore, it is determined that this is the timing of domain change and the processing then proceeds to step S711.

In step S712, the plug-in 115 for browser transmits the HTTP request to the web server 190 suitable to the URL received by the browser 110 in step S701 via the network 180. Then, the processing proceeds to step S713.

In step S713, the browser 110 receives the HTTP response from the web server 190. Then, the processing proceeds to step S714.

In step S714, the plug-in 115 for browser determines whether or not the response received by the browser 110 in step S713 includes the cookie information. When the plug-in 115 for browser determines that the HTTP header of the response received from the web server 190 in step S713 includes a set-cookie header, the plug-in 115 for browser determines that the response received by the browser 110 in step S713 includes the cookie information.

When the plug-in 115 for browser determines that the response received by the browser 110 in step S713 includes the cookie information (YES in step S714), the processing proceeds to step S715. When the plug-in 115 for browser determines that the response received by the browser 110 in step S713 does not include the cookie information (NO in step S714), the processing proceeds to step S718.

In step S715, the plug-in 115 for browser determines whether or not the domain data stored in the domain storage area 116 is similar to the domain data of the cookie included in the response received by the browser 110 in step S713. When the plug-in 115 for browser determines that the two domain data are different from each other (NO in step S715), the processing proceeds to step S716. When the plug-in 115 for browser determines that the two domain data are similar to each other (YES in step S715), the processing proceeds to step S718.

In step S716, the plug-in 115 for browser picks up the domain data from the set-cookie received by the domain storage area 116 in step S713, and stores the domain data in the domain storage area 116.

In step S717, the plug-in 115 for browser sets the domain change flag to TRUE. The processing proceeds to step S718. The domain data of the domain storage area 116 is rewritten. More specifically, this means that the domain of newly-displayed web page is different from the domain of the web page ever-displayed. Therefore, it is determined that this is the timing of domain change and the processing in step S717 is performed. The domain of the web page newly-displayed is different from the domain of the web page ever-displayed. More specifically, this means that the destination from which the web page is obtained is changed.

In step S718, the plug-in 115 for browser determines whether the domain change flag is TRUE. When the plug-in 115 for browser determines that the domain change flag is TRUE (YES in step S718), it is the timing of the domain change and the processing therefore proceeds to step S719. When the plug-in 115 for browser determines that the domain change flag is not TRUE (NO in step S718), the processing proceeds to step S720.

In step S719, the plug-in 115 for browser calls the storage data display module 117, displays the UI (FIG. 2) for displaying the list of stored data on the display device 150, and the processing thereafter proceeds to step S720.

By displaying the web page stored when the domain data of the cookie is changed, the user can check contents input by him/her and the processing ID as a series of operations following the operation for receiving the service. If necessary, the web page is stored again at an arbitrary position at this timing, so that it can be used as a record.

In step S720, the plug-in 115 for browser clears the domain change flag because the determination of the domain for displaying the new URL is completed. Then, the processing proceeds to step S721. In step S721, the browser 110 updates the display to reflect the received web page in the UI of the browser 110 displayed on the display device 150 and the processing then ends.

Thus, when the web page displayed on the display device 150 uses the cookie information, the display data is automatically stored in the storage device in print data format and the user checks the list of web pages stored at the timing set by him/her. After displaying the list of the information that is displayed once on the browser, the user selects and stores the necessary web page. According to the present invention, information just before shifting to the next page is stored. Therefore, the user can store also the information input into the form.

Figure 7:
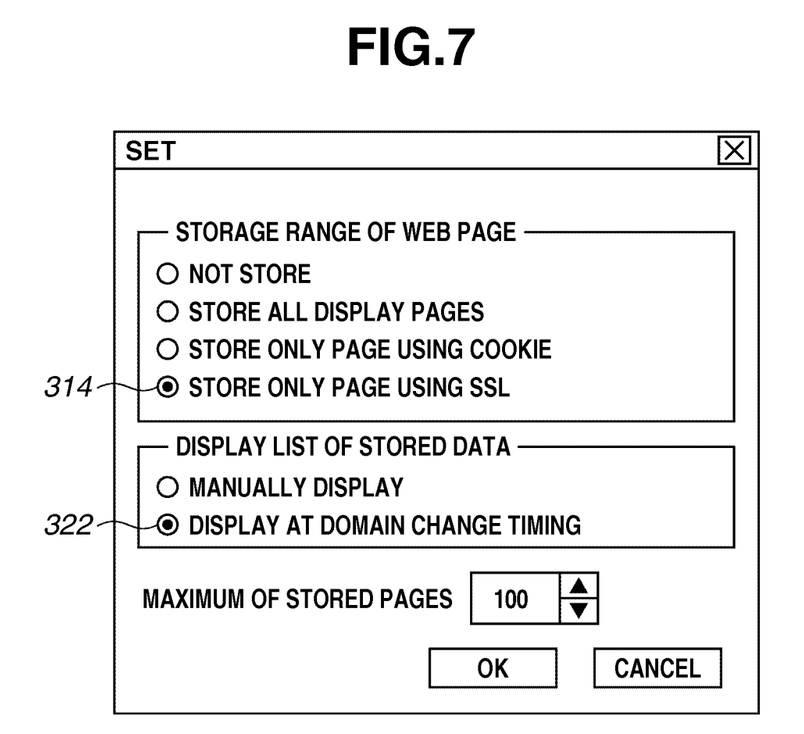
FIG. 7 is a diagram illustrating another example of the UI displayed on the display apparatus.

Next, the third exemplary embodiment of the present invention is described. FIG. 7 is a diagram illustrating an example of the UI displayed on the display device 150 illustrated in FIG. 1. The example illustrates a screen for setting the operation of the plug-in 115 for browser, and the buttons 314 and 322 are selected by the user using the plug-in menu in FIG. 3A.

[Data Storage/List Display]

Figure 8:
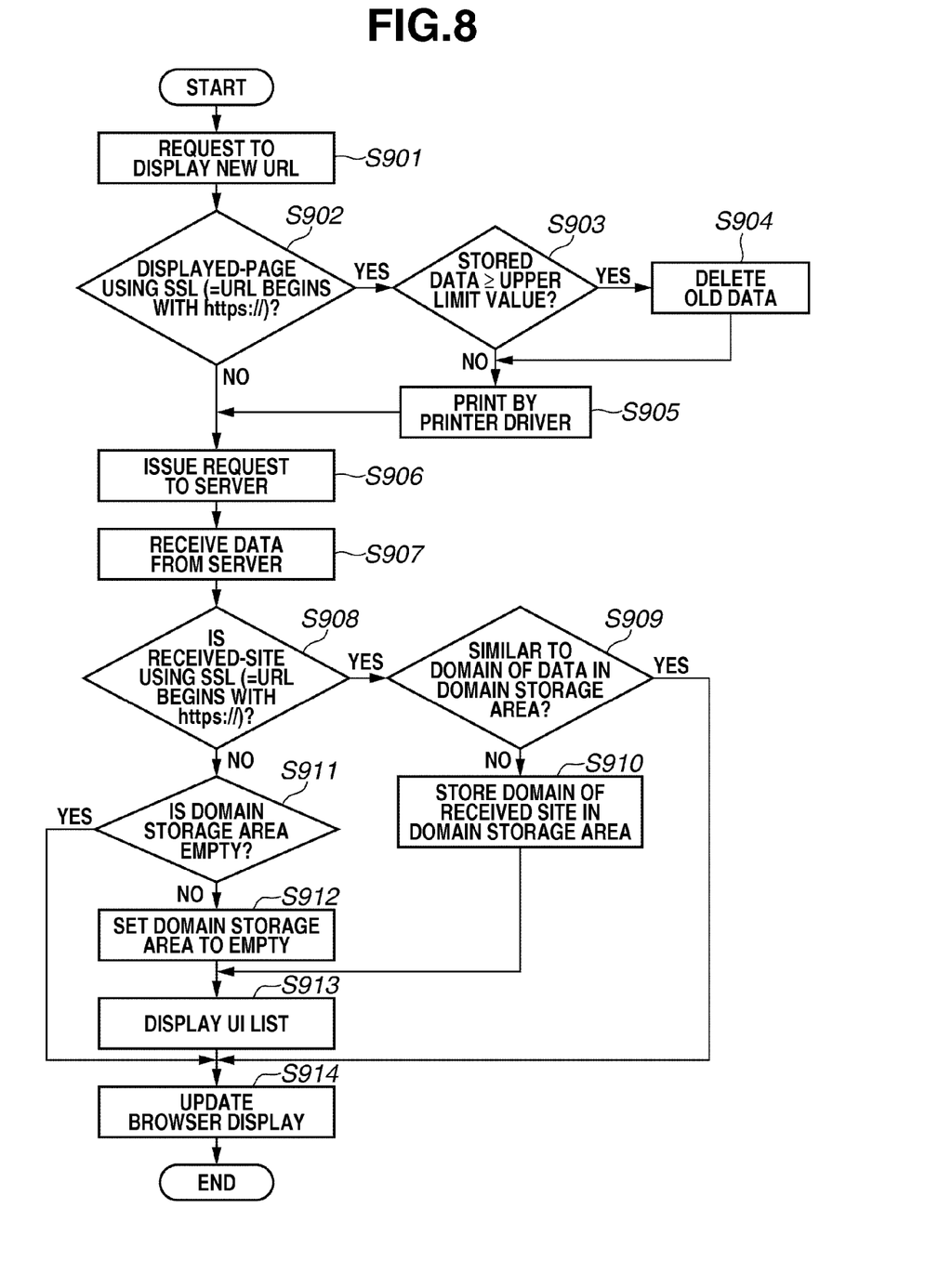
FIG. 8 is a flowchart illustrating another data processing procedure of the information processing apparatus.

FIG. 8 is a flowchart illustrating an example of a data processing procedure in the information processing apparatus according to the third exemplary embodiment. The example illustrates data storage/list display processing using the browser 110, the plug-in 115 for browser, and the printer driver 120 by determining whether or not the SSL is used, analyzing the header based on the HTTP response.

Steps S901 to S914 are realized by loading and executing a program including the browser 110 and the plug-in 115 for browser to the RAM from the hard disk (HD) by the CPU of the computer 100. The processing is executed with the browser 110 and the plug-in 115 for browser integrated. Further, for the sake of description, the processing is described taking the browser 110 and the plug-in 115 for browser as main control units.

In step S901, the browser 110 receives a request for displaying a new URL from the user. In step S902, the plug-in 115 for browser determines whether or not the web page currently-displayed on the display device 150 by the browser 110 uses the SSL. The SSL is an abbreviation of a secure sockets layer protocol. The determination can be made based on whether or not the URL begins with "https://". More specifically, according to the third exemplary embodiment, control is performed to decide whether or not the displayed web page is stored, based on the determination result whether or not the web page uses the SSL.

When the plug-in 115 for browser determines that the currently-displayed web page uses the SSL (YES in step S902), the processing proceeds to step S903. When the plug-in 115 for browser determines that the currently-displayed web page does not use the SSL (NO in step S902), the processing proceeds to step S906.

In step S903, the plug-in 115 for browser determines whether or not the number of data stored in the data storage area 130 is an upper limit value or more, which is set by the maximum-number setting 330 of the stored page. When the plug-in 115 for browser determines that the number of data (web pages) stored in the data storage area 130 is less than the upper limit value (NO in step S903), the processing proceeds to step S905. When the plug-in 115 for browser determines that the number of the web pages stored in the data storage area 130 is the upper limit value or more (YES in step S903), the processing proceeds to step S904.

In step S904, the plug-in 115 for browser sequentially deletes the web pages stored in the data storage area 130 in order of the oldest web pages, up to a number of the web pages less than the upper limit by one value, and the processing proceeds to step S905.

In step S905, the plug-in 115 for browser issues a print instruction of the web page displayed by the browser 110, to the printer driver 120, and the processing proceeds to step S906. In response to the print instruction in step S905, the printer driver 120 generates the print information (in intermediate file format) for data storage.

According to the third exemplary embodiment, the plug-in 115 for browser issues the print instruction to the printer driver 120 at this timing, thereby storing the last state of the web page displayed on the display device 150. Further, in response to the print instruction from the plug-in 115 for browser, the printer driver 120 stores the information on the web page to the storage device, so that all the web pages are stored in a lump. Therefore, the printer driver 120 can also store the data input by the user in the input form in FIG. 3A using the input device 140 together with the web page.

In step S906, the browser 110 transmits a request to the web server 190 suitable to the URL, which is received from the web server 190 in step S901, on the network 180. Then, a response is returned from the web server 190.

In step S907, the browser 110 receives the response returned from the web server 190. Then, the processing proceeds to step S908.

In step S908, the plug-in 115 for browser determines whether or not the received (requested) web page uses the SSL. The determination is performed analyzing the response, in other words, by determining whether or not the URL begins with "https://".

When the plug-in 115 for browser determines that received (requested) web page uses the SSL (YES in step S908), the processing proceeds to step S909. When the plug-in 115 for browser determines that the received web page does not use the SSL (NO in step S908), the processing proceeds to step S911.

In step S911, the plug-in 115 for browser determines whether or not the domain storage area 116 is empty. When the plug-in 115 for browser determines that the domain storage area 116 is not empty and includes the domain data (NO in step S911), the processing proceeds to step S912. In step S912, the plug-in 115 for browser sets the domain storage area 116 to be empty. When the plug-in 115 for browser determines that the domain storage area 116 is empty (YES in step S911), the processing proceeds to step S914.

In step S913, the plug-in 115 for browser calls the storage data display module 117, and displays the UI in FIG. 2 to display the list of the web pages stored in the data storage area 130 on the display device 150.

The domain storage area 116 includes the domain data, that is, the site which is just primarily displayed uses the SSL. Since it is determined in step S908 that the currently-received web page does not use the SSL, this is determined as timing of domain change. In step S913, the plug-in 115 for browser displays the UI in FIG. 4 to display the list of the stored web pages on the display device 150.

In step S909, the plug-in 115 for browser determines whether or not the domain data included in the domain storage area 116 is similar to the domain data of the next-displayed web page. When the plug-in 115 for browser determines that the two domain data are similar to each other (YES in step S909), the processing proceeds to step S914. On the other hand, when the plug-in 115 for browser determines that the two domain data are different from each other (NO in step S909), this is the timing of the change domain. Therefore, in step S910, the plug-in 115 for browser stores new domain data in the domain storage area 116 and the processing proceeds to step S913.

In step S913, the plug-in 115 for browser calls the storage data display module 117, and displays the UI in FIG. 4 to display the list of the stored web pages on the display device 150. Then, the processing proceeds to step S914. When NO in step S908, the processing proceeds to step S911.

When the domain of the web page is changed, the plug-in 115 for browser displays the list of the stored web pages on the display device 150. Thus, the user can check content input by the user as a series of operations following the operation for receiving the service, and the processing ID ex post facto, that is, after the browser 110 shifts the web page to another. If necessary, the web page is stored again in an arbitrary position at this timing, so that it can be used as a record.

In step S914, the browser 110 updates the browser UI (refer to FIG. 3A) displayed on the display device 150 based on the received web page, and the processing ends.

Thus, when the web page displayed on the display device 150 uses the SSL, the displayed web page is automatically stored in the storage device in the print data format, and the user checks later the list of the web pages stored at the timing set by the user.

After displaying the list of the information (web pages) displayed once on the browser, the user selects a necessary web page and stores the selected web page. According to the present invention, since the information just before shifting to the next page is stored, the information input into the form by the user is also stored. By managing the setting for storing the data for every log-in user, the storage condition of the data and the display timing of the stored data may be freely changed according to the user that operates the computer 100.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-180801 filed Aug. 3, 2009, which is hereby incorporated by reference herein in its entirety.

What is claimed is:

1. An information processing apparatus comprising:
   a processor having:
   a generation unit configured to generate a plurality of intermediate files based on a plurality of web pages displayed by a web browser, and save the plurality of intermediate files in a first destination;
   a determination unit configured to determine whether a domain of a web page currently displayed by the web browser is the same as a domain of a previous web page displayed by the web browser;
   a screen unit configured to display a screen to receive from a user an instruction to save an intermediate file which is chosen by the user from the plurality of intermediate files to a second destination different from the first destination in a case where the determination unit has not determined that the domain of the web page is the same as the domain of the previous web page;
   a deletion unit configured to delete, in a case where an amount of the plurality of intermediate files stored in the first destination exceeds an upper limit, any of the plurality of intermediate files stored in the first destination; and
   wherein the intermediate files consist of one of PDF or XPS files.

2. The information processing apparatus according to claim 1, further comprising:
   a setting unit configured to set a storage condition of the plurality of intermediate files,
   wherein the generation unit saves the plurality of intermediate files to the first destination based on the storage condition set by the setting unit.

3. The information processing apparatus according to claim 2, wherein the storage condition enables the selection of all pages, a page in a specific session mode, or a page in a specific-information write mode.

4. The information processing apparatus according to claim 1, wherein the generation unit generates the plurality of intermediate files by a print instruction.

5. A data processing method of an information processing apparatus the data processing method comprising:
   generating a plurality of intermediate files based on a plurality of web pages displayed by a web browser, and save the plurality of intermediate files in a first destination;
   determining whether a domain of a web page currently displayed by the web browser is the same as a domain of a previous web page displayed by the web browser;
   displaying a screen to receive from a user an instruction to save an intermediate file which is chosen by the user from the plurality of intermediate files to a second destination different from the first destination in a case where it is not determined that the domain of the web page is the same as the domain of the previous web page;
   deleting, in a case where an amount of the plurality of intermediate files stored in the first destination exceeds an upper limit, any of the plurality of intermediate files stored in the first destination; and
   wherein the intermediate files consist of one of PDF or XPS files.

6. The data processing method according to claim 5, further comprising:
   setting a storage condition of the plurality of intermediate files,
   wherein the plurality of intermediate files are saved to the first destination based on and the set storage condition in the display control.

7. The data processing method according to claim 6, wherein the storage condition enables the selection of all pages, a page in a specific session mode, or a page in a specific-information write mode.

8. A non-transitory computer-readable storage medium for storing a program to allow the computer to execute the data processing method according to claim 5.

9. The data processing method according to claim 5, wherein the plurality of intermediate files is generated by a print instruction.

* * * * *